Jan. 5, 1960  L. A. MAYBARDUK  2,919,605
MECHANICAL INTEGRATOR
Filed July 31, 1953  2 Sheets-Sheet 1

DIFFERENTIAL

INVENTOR.
Leon A. Maybarduk

BY
ATTORNEY

Jan. 5, 1960 L. A. MAYBARDUK 2,919,605
MECHANICAL INTEGRATOR
Filed July 31, 1953 2 Sheets-Sheet 2
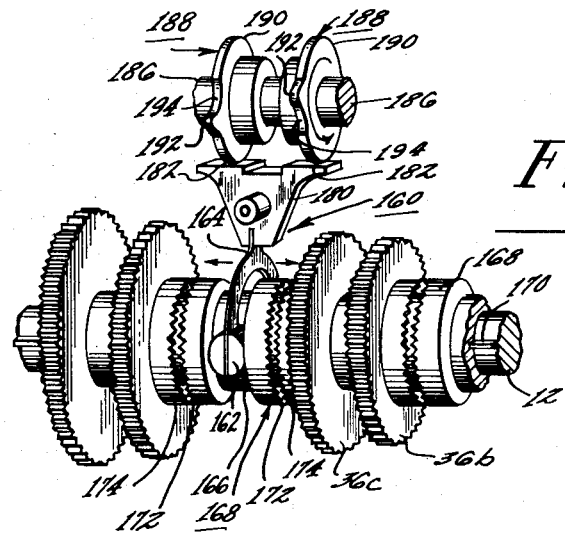
Fig.3.
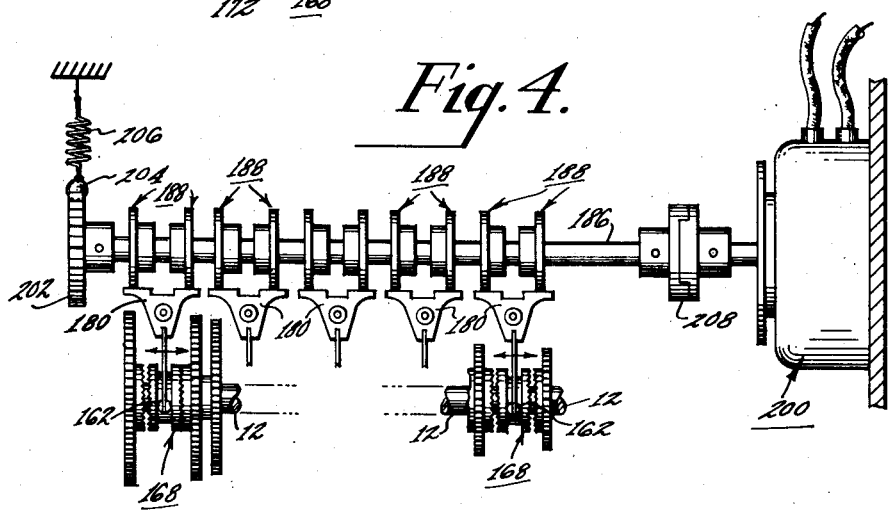
Fig.4.
Fig.5.
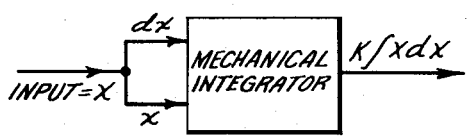
Fig.6.
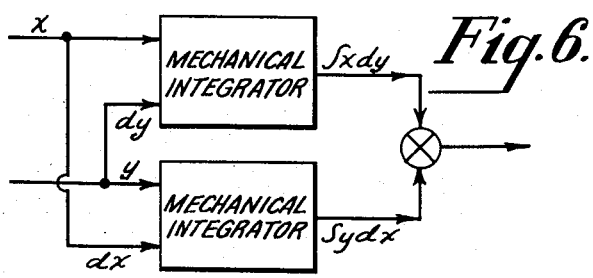
INVENTOR.
Leon A. Maybarduk
BY
ATTORNEY

United States Patent Office 2,919,605
Patented Jan. 5, 1960

2,919,605
MECHANICAL INTEGRATOR

Leon A. Maybarduk, Haddonfield, N.J., assignor, by mesne assignments, to the United States of America as represented by the Secretary of the Air Force Application July 31, 1953, Serial No. 371,510

2 Claims. (Cl. 74—681)

This invention relates to mechanical integrating mechanisms, and more particularly to an improvement in mechanical gear ratio changers.

Beacon navigation equipment of the Shoran type, such as that described by G. C. Danielson in the book "Radar Beacons," pp. 426–33, published by the McGraw-Hill Book Co. (vol. 3, Radiation Laboratory Series, 1947), utilizes a computing section for converting variable electronic measurements into direct representations of distances. The operation of this computing section requires the multiplication of a figure representative of a trigonometric function by a value representative of a variable rate of rotation.

The multiplying operation required is thus, in effect, a change of rotative movement in proportion to a constant value. The problem is complicated, however, by the particular requirements of all airborne equipment, which must be compact in design yet precise in operation. The components of the Shoran system must be accurate to one part in a thousand, and any multiplying device must as well be accurately indexed at all times in relation to a given set of conditions and also be continuous in operation during all possible changes in the operating variables.

The structures of the prior art are not wholly satisfactory for such an application. Electrical methods of achieving the desired result, for example, must operate within limits and thus cannot have the desired continuity of operation. Practical difficulties in design also require extremely complex circuits to provide a wide range of multiplier values and to avoid inaccuracies due to variations in components and power supplies. The geared structures used heretofore for multiplying or ratio changing are likewise not wholly satisfactory because they require either an excessively large number of gears to supply the desired range of values, or also need complicated clutching arrangements to select any of those values. The compactness necessary to Shoran equipment, particularly as used in aircraft, cannot satisfactorily be supplied by such structures.

Various friction integrators are used in computing equipment to perform similar multiplying functions. These integrators are shown generally by Svoboda in the book "Computing Mechanism and Linkages," at pp. 23–26, published by the McGraw-Hill Book Co. (vol. 27, Radiation Laboratory Series, 1948). They include various friction-wheel, double-ball, and cylinder-sphere-disk integrators, all of which rely on frictional contacts and movements. The action of a friction-wheel integrator, for example, requires that the wheel be pressed against a plane disk. The rotation of the disk represents one parameter and the relative position of the friction-wheel with respect to the disk the second parameter. The output parameter is then generated as a rotation of the friction-wheel. The use of frictional contacts, however, means that considerable slippage will occur unless the operating parts are forced together, in which case a considerable, and undesirable, load is forced into the system without entirely eliminating the slippage. Furthermore, placement of the friction-wheel must be extremely precise if the output is to be of the required accuracy.

In a copending application of K. G. Kaufmann and J. L. Owings entitled "Gear Ratio Changer," Serial No. 365,126, filed June 30, 1953, now Patent No. 2,789,445, granted April 23, 1957, there is disclosed a structure for performing this multiplying function which satisfies these requirements. Briefly, the system therein disclosed uses a plurality of geared decade stages in cascade with each stage representing an order of value. A cone of gears within each stage is given a relative rotation dependent upon the order of value selected for that stage. A sampling system then drives the output of each stage with one of the cone of gears, and the incremental output rotations thus derived are algebraically combined in a differential system.

The present invention is an improvement on the system disclosed by Kaufmann and Owings in the above mentioned copending application. By reason of the advantages of its novel features, however, this invention has wide application in functions other than that of performing variable multiplications.

Accordingly, an important object of this invention is to provide an improved and positively driven mechanical integrator.

Another object is to provide an improved gear ratio changer.

A further object is to provide rapid and convenient means for selecting ratios in a variable gear ratio changer.

Still further objects of this invention are to provide a ratio selecting mechanism which is not subject to damage by improper manipulation or by the engagement of gears.

Yet another object of the present invention is to provide a mechanical gear ratio changer having a wide range of operating values.

Another important object is to provide a gear ratio changer usable in a variety of mathematical processes.

These and other objects of this invention are accomplished, in the preferred embodiment of this invention, by the employment of novel means for supplying, selecting, and combining incremental variations of an input rotation. Coupled input shafts responsive to a continuously varying parameter are successively reduced in rotation so as to represent successive orders of value. An output shaft parallel to each input shaft carries a plurality of freely rotating driven gears which are turned in progressively varying increments by separate driving gears fixed on the input shaft. Two-way clutches mounted on the output shaft between the driven gears can engage any of the driven gears and thereby rotate the output shaft at incremental variations of the input shaft. Individual cams mounted on a camshaft drive the clutches into engagement to maintain a constant incremental rotation or to represent an incrementally varying parameter. The output rotations are combined in a differential system in which the first input rotation is effectively employed to produce an increased range of incremental values. The resultant output parameter is the integral of a continuously varying parameter and an incrementally varying parameter.

The novel features of the invention, as well as the invention itself, both as to its organization and method of operation, will best be understood from the following description, when read in connection with the accompanying drawings in which:

Fig. 3 is a detail in perspective of the clutch selecting the engaging mechanism of the preferred embodiment.

Fig. 4 is a plan view of an alternative structure for selecting the incremental input.

Fig. 5 is a block diagram showing the use of the invention of a squaring device.

Fig. 6 is a block diagram showing the use of the invention as a device for finding the product of two variables.

Figure 1:
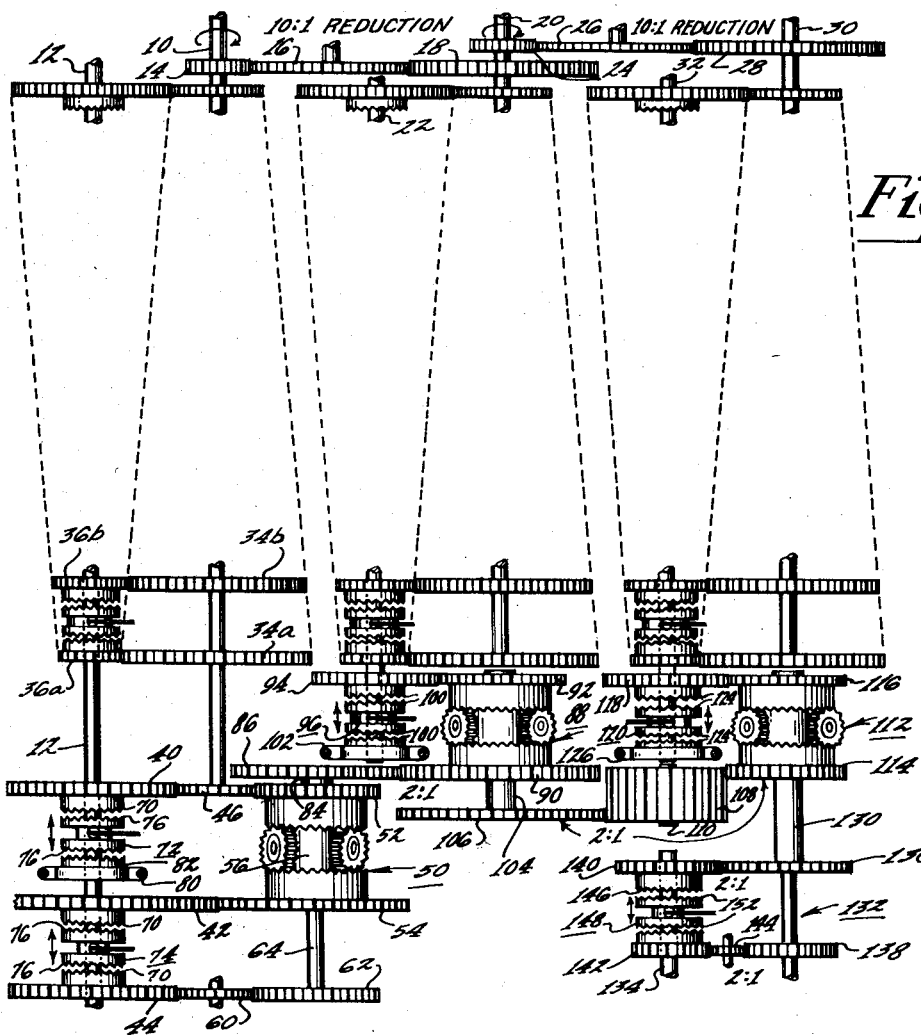
Fig. 1 is a schematic representation of the system of the preferred embodiment.
Figure 2:
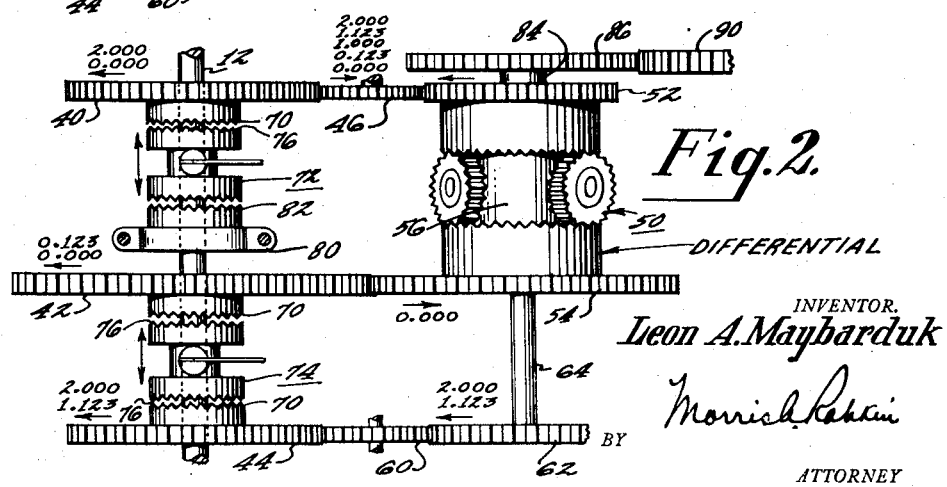
Fig. 2 is a detail schematic of the output control system in the first stage of the preferred embodiment.

The preferred embodiment of the invention shown in Figs. 1 and 2 employs three stages, termed here the first, second, and third stages, having similar rotation producing systems. Referring to Fig. 1 and Fig. 2 for details an input shaft 10 hereafter called the first input shaft, is rotated in response to a continuously varying input signal. A gear train 14, 16, 18 couples the first input shaft 10 to the input shaft 20 of the second stage, hereafter called the second input shaft, and provides a speed reduction of 10:1 between the shafts. Similarly, the second input shaft 20 drives a third input shaft 30 through a gear train 24, 26, 28 having a 10:1 reduction in speed. Within each stage is an output shaft, hereafter called the first, 12, second, 22, or third, 32 output shaft in correspondence to the stage in which it is employed, mounted parallel to the input shaft in that stage. Since the method of producing incremental variations within a stage is similar for all stages, only the method in the first stage will be described. There, a sequence of driving gears 34a, 34b, etc., is fixedly mounted along the first input shaft 10. A sequence of driven gears 36a, 36b, etc., each in mesh with a driving gear, is rotatably mounted on the first output shaft 12. The ratio between each driving gear and its meshing driven gear is less than unity, and varies progressively from 0.1 to 0.9. Although there is shown only a fractional view of the gearing structure of each stage, it will be understood that the remaining gearing arrangements are similar, and it will be recognized that as many as desired for a mathematical process can be employed.

By means to be described in detail herein, any of the driven gears 36a etc. can be held against rotative movement in relation to the first output shaft 12, so as to turn that shaft. The second 22 and third 32 output shafts can be similarly turned. A series of three output control gears, 40, 42, 44, each rotatably mounted, is positioned along the first output shaft 12. The first output control gear 40 is coupled to a unity control gear 46 mounted on the first input shaft 10 which meshes with one input, 52 here called the first input, of a first differential 50. The second output control gear 42 meshes directly with an input 54, here called the second input, of the differential 50. The third output control gear 44 is also coupled to the second input 54 of the differential 50, through an idler 60 and a gear 62 mounted on a shaft 64 fixed to the input gear 54. This differential, and others employed in the system, is of the type well known in the art, wherein application of rotations in the same direction to each of two inputs 52, 54 results in rotation in the same direction of a cage 56 at one-half the sum of the input rotations. Each of the output control gears 40, 42, 44 has a toothed facing element 70 concentric with the first output shaft 12. The shaft also supports control engaging elements consisting of a first and a second output control clutch 72, 74 each of which has toothed facing elements 76 on both sides. The control clutches 72, 74 are slidably mounted on the first output shaft 12 but are held against rotation by a key and a keyway (not shown). The first control clutch 72 can engage either the first output control gear 40 or the toothed facing element 82 of a fixed first holding member 80. The second control clutch 74 can engage either the second output control gear 42 or the third output control gear 44.

The cage or output shaft 84 of the first differential carries a gear 86 which meshes directly with one input gear 90 of a second differential 88, and is in a 2:1 ratio to that input. The other input gear 92 of the second differential 88 meshes directly with a gear 94 rotatably mounted on the second output shaft 22. The second output shaft 22 can either turn this gear 94 or be held against rotation by a clutch 96 movable along it on a keyway and key (not shown), and adapted to engage through toothed facing elements 100 either the gear 94 or a fixed second holding member 102.

Similarly, the cage or output shaft 104 of the second differential 88 carries a gear 106 which meshes, through an idler 108 supported on a shaft 110, with one input gear 114 of a third differential 112, and is in 2:1 ratio to the input. And the third output shaft 32 carries a rotatable gear 118 which meshes directly with the other input gear 116 of the third differential 112, as well as a clutch 120 movable along it on a keyway and key (not shown) to engage by toothed facing elements 124 either the gear 118 or a fixed third holding member 126.

The cage or output shaft 130 of the third differential 112 is the system output shaft. It is coupled through a reversing system 132 to a reversible system output shaft 134 which in turn supplies the output parameter of the system to external associated equipment. The reversing system consists of two driving gears 136, 138 fixedly mounted on the system output shaft 130 and two opposed driven gears 140, 142 rotatably mounted on the reversible system output shaft 134, with one driven gear 140 meshing directly with its opposed driving gear 136 and the other driven gear 142 being turned by an idler 144 interposed between it and its opposed driving gear 130. The ratios between driving and driven gears is 2:1. Each driven gear 140, 142 has a toothed facing element 152 on the side between the driven gears. A two way clutch 148 is slidably mounted on a keyway and key (not shown) along the reversible system output shaft 134. It has toothed facing elements 152 on opposite sides, so that it can engage either of the driven gears 140, 142. The method of actuating the various clutching elements to affect output shaft rotation is the same as for the driven gears within a stage, which method is set forth immediately below.

Reference is now being made to Fig. 3, wherein is shown the structure employed in the preferred embodiment for rotating the output shafts by the driven gears. The clutch shifting mechanism 160 includes an engaging pin 162 mounted on each end of a forked spring member 164 and fitting slidably into a grooved surface 166 extending around a two way engaging element 168, or clutch, mounted on the output shaft 12. The clutch 168 rotates with the shaft 12 because of a key and keyway 170 along the shaft, but the clutch 168 can move longitudinally along the key 170 in either direction. It has toothed facing elements 172 on both sides adapted to engage similar elements 174 on the driven gears 36b, 36c, etc. The other end of the forked spring member 164 is held in a pivoted shifting lever 180 having plane cam engaging surfaces 182 on its upper end. A rotatable cam shaft 186 responsive to incremental variations is positioned parallel to the output shaft 12. The cam shaft 186 has individual cams 188 aligned with each of the cam engaging surfaces 182, each of the cams having a considerable cam dwell portion 190 and a pronounced cam lobe 192 plus a relief or clearance surface 194. The relief surfaces 194 and cam lobes 192 are in complementary position on the cams 188, so that when one cam engaging surface 182 of a shifting lever 180 is forced down, the cam relief area 194 on the opposing cam 188 permits the other cam engaging surface 182 to rise. The shifting lever 180 thus is at all times positively held, including when in neutral position. A conventional detent arrangement (not shown) for each camshaft provides positive switching and setting in the embodment. A similar clutch shifting mechanism 160 is employed for each driven gear and for the output control clutches and holding means within the stages. The same camshaft within each stage controls the selection of the clutches.

Thus, the camshaft 186 for the first stage has cams appropriately placed to provide engagement of the nine driven gears 36a, 36b, etc., the first output control gear 40, the first fixed holding member 80, the second output control gear 42, and the third output control gear 44. The camshaft for the second and third stages each have cams to provide engagement of nine driven gears and a fixed holding member. The cam lobes are placed so that only one driven gear can be engaged at a time. A separate camshaft and selector (not shown) is provided for the reversing mechanism at the system output shafts.

Operation of the ratio selecting mechanism is as follows. Still referring to Fig. 3, an incremental rotational variation is selected at each stage by rotation of the cam shafts within each stage. This moves a cam lobe down 192, against the cam engaging surface 182 of the pivoted shifting member 180. The pivoted shifting member 180 is in turn forced down on one side, and the forked spring member 164 and engaging pins 162 force the toothed facing element 172 of the two way clutch 168 into engagement against the similar members 174 on the driven gears 36b, 36c, etc. The key 170 between the two way clutch 168 and the output shaft 12 then rotates the output shaft 12 with the selected driven gear. The same action occurs at selected output control gears, fixed holding members, and the reversing mechanism.

This being the method of selecting gears for rotating the output shafts, the system as a whole operates in the following manner. Referring to Fig. 1, an input rotation is placed on the input shaft 10 of the first stage. This is transmitted serially through one gear train 14, 16, 18 to the second input shaft 20 which rotates 1/10 as much, and then through another gear train 24, 26, 28 to the third input shaft 30, which rotates 1/100 as much as the first input shaft 10. The input shaft rotations thus correspond to three successive orders of value. Engagement of selected gears in each stage provides direct drive of the output shafts 12, 22, 32 at selected ratios to the stage input rotations, thus providing incremental variations of each order of value. The output shafts 12, 22, 32 all rotate in the same direction, since the gear reducing trains provide that all input shafts 10, 20, 30 rotate in the same direction.

The incremental variations of each order of value, corresponding to the digits of a three digit figure, are at any set condition combined by the first, second, and third differentials 50, 88, 112 to produce a system output rotation. The cooperation between the output control gears 40, 42, 44, the fixed holding members 80, 102, 126 and the differentials 50, 88, 112, however, is dependent upon the range of values chosen, because of the means employed to double the range of operating values. The operation of the system is thus best described with reference to Figs. 1 and 2 by showing five static conditions of operation covering the possible range—.000; .123; 1.000; 1.123; 2.000.

With a static 000 multiplier value chosen, no driven gears are selected in any of the stages The first and second output control gears 40, 42, however, are engaged to the first output shaft 12 through the first and second control clutches 72, 74. Thus when the first input shaft 10 is rotated, say clockwise, the first input 52 of the first differential 50 is driven counterclockwise directly from the unity control gear 46 on the first input shaft 10, but the second input 54 is driven clockwise at an equal rate from the unity control gear 46 through the first output control gear 40 and the second output control gear 42, which rotate the first output shaft 12 counterclockwise. The inputs cancel, and no output is derived from the first differential. The second and third output shafts 22, 32 are held against rotation by the second and third fixed holding members 102, 126, so that there is no input to or output from the second 88 and third 112 differentials, and consequently no system output.

Where a zero occurs in the first stage the above cancellation of rotations in the first stage is used. The second and third stages use the fixed holding members to produce a desired zero increment in those stages.

Assuming a static .123 multiplier value for the system, the output combination is as follows. In the first stage the complementary value of .1 is chosen, this being .9 with a decade of values. It is subtracted from the input rotation to obtain the desired .1 increment by engaging the second output control gear 42. The first input 52 of the first differential 50, which is turned by the unity control gear, 46, then turns counterclockwise, assuming the input shaft 10 to rotate clockwise. The second output control gear 42 rotates counterclockwise and turns the second input 54 of the first differential 50 clockwise. These opposed input rotations produce a counterclockwise rotation of one-half their difference on the differential output 84. The 2:1 ratio between the driving gear 86 mounted on the output shaft 84 of the first differential 50 and the direct meshing input 90 of the second differential 88 drives that input at .1 value clockwise. The other input 92 of the second differential 88 also rotates clockwise, because it is directly meshing with the drive gear 94 on the second output shaft 22 which, as previously explained, rotates as does the first output shaft 12. This input has an incremental rotation of .02, so that the output of the second differential 88 is $$\frac{.1+.02}{2}$$

clockwise.

Algebraic combination of rotations is the same in the third stage as in the second stage. A 2:1 reduction between the gear 106 on the output shaft 104 of the second differential 88 and the coupled input 114 of the third differential 112 puts a .1+ .02 rotation on that input. This is clockwise because of the idler 108 in the coupling to the second differential output 104. The third output shaft 32 turns counterclockwise, and the gear 118 mounted on it and meshing with the other input 116 of the third differential 112 gives that input a clockwise .003 rotation. The output shaft 130 of the third differential 112 thus has a $$\frac{.1+.02+.003}{2}=\frac{.123}{2}$$

rotation clockwise. This is the system output rotation, and the reversible system output is doubled in speed, because of the 2:1 ratio between driving 136, 138 and driven 140, 142 gears on the system output shafts 130, 134. It can also be changed in direction as desired because the two way clutch 148 can engage either the direct coupled gears 136, 140, or the gears 138, 142 utilizing an idler 144.

For a static multiplying condition of 1.000 on the system, all three output shafts 12, 22, 32 are kept immobile by the fixed holding members 80, 102, 126. Thus a clockwise rotation on the first input shaft 10 and the unity control gear 46 produces a counterclockwise rotation of ½ on the first differential output shaft 84 which proceeds through the second 88 and then the third differential 112 to the system output shaft 130. It is alternately changed from full unity value at the differential inputs to ½ value at the differential outputs, but results in a unity rotation at the reversible system output shaft 134.

If a condition of 1.123 is assumed, the system combines rotations as in the .123 condition except in the first stage. There the gear ratio .1 itself, not its complement, is used as the output rotation. This is counterclockwise if the input shaft 10 rotation is clockwise, so the third output control gear 44 is engaged. This is coupled to the second input 54 of the first differential 50 through an idler 60, and the second input 54, as well as the first input 52 which is driven directly from the unity control gear 46 rotates counterclockwise. The combined output at the output shaft 84 of the differential is $$\frac{1+.1}{2}$$

counterclockwise, and thereafter the system functions as in the previously described .123 condition.

For a condition of 2.000 the output shafts 22, 32 of the second and third stages are locked to the fixed holding members 102, 126. The first and third output control gears 40, 44 are engaged to the first output shaft 12, so that clockwise rotation of the first input shaft 10 and the unity control gear 46 results in unity counterclockwise rotation of the first and third output control gears 40, 44. Again, this causes counterclockwise movements in both inputs 52, 54 of the first differential 50, and a counterclockwise output rotation of $$\frac{1+1}{2}$$

Combination of this output into a final system output is once more as previously described. Note that stages 2 and 3 can still add increments of rotation to this condition, so that the maximum possible multiplier value is 2.099.

Although static conditions only have been heretofore described, it will be apparent to those skilled in the art that the device of this invention functions inherently as a semi-digital mechanical integrator. Its operation as an integrator requires only that the cam shafts be rotated in response to an incrementally varying parameter, such as is encountered, for example, in any decade counter. The integration is then produced by approximating a given curve by a series of small rectangles, one side of which is the incrementally varying parameter, the other side of which is the continuously varying parameter. The output parameter, or the area beneath the curve, is thus the summed rotation of the reversible system output shaft, which can be found by ordinary counting methods. Negative as well as positive values will be accurately represented in the integrator.

Because gearing methods are used the integrator is accurate and precisely indexed no matter what the range of variables chosen. Inaccuracies due to the time required to switch between the incremental values are minimized because of extremely fast action permitted by the cam and two-way clutch arrangements. It will be obvious to those skilled in the art that the cam and lever design can be such that switching time is of a very small order. The use of cam lobes and complementary cam relief areas means that all clutches are positively held at all positions, including neutral. There is thus no vibrative effect or inaccuracy.

If greater accuracy is desired in any use of this invention the number of increments within a stage or the number of stages can be increased. For Shoran equipment the preferred embodiment described is accurate to one part in 2.099, as well as continuously variable and bidirectional. It further has the advantages that there is no gear wear due to clashing or possibility of operator mistake which will damage the system, and the system is independent of its environment in maintaining its accuracy despite wear or external conditions.

Fig. 1 shows the compactness and simplicity of the preferred embodiment. The entire three stage assembly of the preferred embodiment may be constructed in a volume of 4" x 4" x 7". The selectors for the three stages are arranged in order across the face of the assembly, and the entire range of values can be supplied merely by turning the controls for the camshafts.

An alternative method for controlling the incremental input is shown in Fig. 4. There the camshaft 186 is turned through a coupling 208 by a rotary solenoid 200 of the type which rotates through any desired predetermined angle when energized. A detent wheel 202, ball 204 and spring 206 on the camshaft 186 provide the incremental variations in the camshaft motion. With this arrangement the incremental variable can be rapidly and easily put into the system even though it originates as a continuous variable.

Another feature of this invention resides in the provision of a combination of characteristics which permits a number of mathematical adaptations. In its simplest application, that of acting as a constant speed multipler, the output of the device is, mathematically, as follows:

$$\omega = \int K dx = Kx$$

If the continuously variable input and the incrementally variable input are both driven by the same input source, the device acts to square the input quantity, as shown in Fig. 5. The output of this arrangement then is:

$$\omega = K\int x dx = \frac{k}{2}x^2$$

A further example of the arrangements possible with the present invention is its use for finding the product of two variables, as in Fig. 6.

In this application two of the devices are cross coupled, and their outputs summed, to perform the methematical operation:

$$\omega = \int xyd + \int ydx = ry$$

It is to be noted that the desired output is in all cases continuous, nearly instantaneous, and precise. Further, wherever application of the device is employed it preserves its mechanical advantages and operative stability.

Thus there has been described a novel and efficient gear ratio changer employing a plurality of gears and selecting elements and cascaded stages to provide rapid gear ratio changing over a wide range.

I claim:

1. A gear ratio changing system comprising a rotatable input shaft, a plurality of driving gears mounted on said shaft, a rotatable output shaft mounted in fixed relation to said input shaft, a plurality of driven gears rotatably mounted in spaced relation on said output shaft, each of said driven gears meshing with one of said driving gears, a plurality of engaging elements slidably mounted on said output shaft, one of said engaging elements being adjacent each of said driven gears, a plurality of shifting members transverse to said output shaft and cooperatively associated with said engaging elements, each of said shifting members being pivotally mounted about a fixed point whereby to move said engaging elements into contact with said driven gears, a cam shaft having cams thereon cooperatively associated with said shifting members for controlling the position of said engaging elements, first, second, and third output control gears rotatably mounted on said output shaft, a unity control gear fixedly mounted on said input shaft and meshing with said first output control gear, a differential having a first input in mesh with said unity control gear, and a second input in mesh with said second output control gear, an idler coupling said third output control gear to the second input of said differential, and a pair of control engaging elements slidably mounted on said output shaft whereby to contact said output control gears and to impart the motion of said output control gears to said second input of said differential.

2. A gear ratio changing system comprising a plurality of geared decade stages in cascade, each of said stages having a rotatable input shaft, a plurality of driving gears mounted on said shaft, a rotatable output shaft in fixed relation to said input shaft, a plurality of driven gears rotatably mounted in spaced relation on said output shaft, each of said driven gears meshing with one of said driving gears, a plurality of engaging elements slidably mounted on said output shaft, one of said engaging elements being adjacent each of said driven gears, a plurality of shifting members transverse to said output shaft and cooperatively associated with said engaging elements, each of said shifting members being pivotally mounted about a fixed point whereby to move said engaging elements into contact with said driven gears, a cam shaft having cams thereon cooperatively associated with said shifting members for controlling the position of said engaging elements, a first of said stages having means, including a differential and a plurality of control gears, coupled to said input and said output shafts for algebraically combining the rotations of said input and output shafts, a plurality of speed reducing gears serially coupling the input shafts of said stages for driving said input shafts in fixed ratios, and means, including a plurality of differentials, coupling the means for algebraically combining the rotations of the shafts of the first stage to the output shafts of the succeeding stages, for algebraically combining the rotations thereof whereby to provide a product rotation from the rotation of the input shaft of the first of said stages.

References Cited in the file of this patent

UNITED STATES PATENTS

| | | |
|---|---|---|
| 987,665 | Allen | Mar. 21, 1911 |
| 1,662,164 | Pratt | Mar. 13, 1928 |
| 1,852,282 | Biggert | Apr. 15, 1932 |
| 2,152,044 | Gross et al. | Mar. 18, 1939 |
| 2,514,158 | Hussain | July 4, 1950 |
| 2,521,771 | Bechle | Sept. 12, 1950 |

FOREIGN PATENTS

| | | |
|---|---|---|
| 727,212 | Germany | Oct. 29, 1942 |